United States Patent
Lombetti et al.

(10) Patent No.: US 12,319,624 B2
(45) Date of Patent: Jun. 3, 2025

(54) METHOD OF MANUFACTURING CMC COMPONENT

(71) Applicant: ROLLS-ROYCE plc, London (GB)

(72) Inventors: Diego M Lombetti, Bristol (GB); Scott T A Rowlands, Cardiff (GB); Megan E Channon, Bristol (GB)

(73) Assignee: ROLLS-ROYCE plc, London (GB)

( * ) Notice: Subject to any disclaimer, the term of this patent is extended or adjusted under 35 U.S.C. 154(b) by 45 days.

(21) Appl. No.: 18/513,794

(22) Filed: Nov. 20, 2023

(65) Prior Publication Data
US 2024/0199500 A1   Jun. 20, 2024

(30) Foreign Application Priority Data
Dec. 15, 2022 (GB) .................................... 2218956

(51) Int. Cl.
*F01D 5/28* (2006.01)
*C04B 35/80* (2006.01)

(52) U.S. Cl.
CPC .............. *C04B 35/80* (2013.01); *F01D 5/282* (2013.01); *F01D 5/284* (2013.01); *F05D 2230/31* (2013.01); *F05D 2300/6033* (2013.01)

(58) Field of Classification Search
CPC ......... F01D 5/282; F01D 5/284; C04B 35/80; F05D 2230/31
See application file for complete search history.

(56) References Cited

U.S. PATENT DOCUMENTS

| | | | |
|---|---|---|---|
| 10,569,481 B2 * | 2/2020 | Gallier | B29D 99/0028 |
| 11,370,181 B2 * | 6/2022 | Van Nieuwenhove | B29C 70/30 |
| 2008/0124512 A1 | 5/2008 | Steibel et al. | |
| 2016/0333698 A1 | 11/2016 | Weaver et al. | |
| 2016/0356499 A1 | 12/2016 | Freeman et al. | |
| 2017/0370583 A1 | 12/2017 | Marusko et al. | |
| 2019/0111636 A1 | 4/2019 | Van Nieuwenhove et al. | |
| 2019/0359531 A1 | 11/2019 | Steffier et al. | |

OTHER PUBLICATIONS

Jul. 31, 2023 Search Report issued in British Patent Application No. 2218956.7.

* cited by examiner

*Primary Examiner* — Michael L Sehn
(74) *Attorney, Agent, or Firm* — Oliff PLC

(57) ABSTRACT

A method of manufacturing a CMC component includes performing a plurality of manufacturing stages. Each manufacturing stage includes layering a ply on a mandrel if a current manufacturing stage is a first manufacturing stage; layering a ply on the CMC component formed in a preceding manufacturing stage if the current manufacturing stage is subsequent to the first manufacturing stage; determining an intermediate weight of the CMC component after layering the ply in the current manufacturing stage; determining a first weight difference between the intermediate weight of the CMC component and a target weight corresponding to the current manufacturing stage; determining a second weight difference between the first weight difference and the corresponding weight of remaining parts; selecting a part from the remaining parts for which the second weight difference is minimum; and disposing the selected part on the ply layered in the current manufacturing stage.

12 Claims, 4 Drawing Sheets

METHOD OF MANUFACTURING CMC COMPONENT

This specification is based upon and claims the benefit of priority from UK Patent Application Number 2218956.7 filed on 13 Dec. 2022, the entire contents of which are incorporated herein by reference.

BACKGROUND

Field of the Disclosure

The present disclosure relates to a method of manufacturing a ceramic matrix composite (CMC) component.

Background of the Disclosure

Ceramic matrix composite (CMC) components are frequently used for various high temperature applications. CMC components are typically lightweight and exhibit high strength in hot, corrosive, and oxidating atmospheres.

CMC components can be manufactured using an automated fibre placement (AFP) process. AFP process may include layering prepreg plies from a prepreg tape on a flat or shaped mould and disposing a plurality of parts between subsequent prepreg plies to form a multi-layered preform that is later cured (e.g., in an autoclave) to produce a hardened CMC component. Prepreg tapes may include a prepreg material that is wound on a bobbin.

However, the weight of the prepreg material may vary between different bobbins of prepreg tapes. Moreover, during AFP layup, the prepreg material is generally not deposited in its fully compacted state. This lack of compaction combined with the variation of weight of the prepreg material may result in an "as-laid" preform thickness to be greater than an "as-cured" preform thickness. The difference between the as-laid preform thickness and the as-cured preform thickness is traditionally referred to as "bulk".

Variation of bulk between preforms of like CMC components may result in inconsistencies between cured CMC components. Therefore, there remains a need to minimize the variation of bulk between the preforms of like CMC components.

SUMMARY OF THE DISCLOSURE

According to a first aspect there is provided a method of manufacturing a ceramic matrix composite (CMC) component. The method includes manufacturing a plurality of parts. The method further includes determining corresponding weights of the plurality of parts. The method further includes determining a plurality of target weights corresponding to a plurality of manufacturing stages of the CMC component. The method further includes performing the plurality of manufacturing stages. Each manufacturing stage includes layering at least one ply on a mandrel if a current manufacturing stage is a first manufacturing stage from the plurality of manufacturing stages. Each manufacturing stage includes layering at least one ply on the CMC component formed in an immediately preceding manufacturing stage from the plurality of manufacturing stages if the current manufacturing stage is any manufacturing stage subsequent to the first manufacturing stage. Each manufacturing stage further includes determining an intermediate weight of the CMC component after layering the at least one ply in the current manufacturing stage. Each manufacturing stage further includes determining a first weight difference between the intermediate weight of the CMC component and a corresponding target weight from the plurality of target weights. The corresponding target weight corresponds to the current manufacturing stage. Each manufacturing stage further includes determining a second weight difference between the first weight difference and the corresponding weight of each of the remaining parts from the plurality of parts. Each manufacturing stage further includes selecting at least one part from the remaining parts for which the second weight difference is minimum among the remaining parts. Each manufacturing stage further includes disposing the selected at least one part on the at least one ply layered in the current manufacturing stage.

The method of the present disclosure may minimize a variation of bulk and weight between multiple units the CMC component before curing. By using the method, the multiple units of the CMC component may have substantially similar weight and bulk before curing. As a result, after curing, the multiple units of the CMC component may have similar physical characteristics. The method may reduce variation between the multiple units of the CMC component.

In some embodiments, the at least one ply is layered in each manufacturing stage by automated fibre placement (AFP). AFP process may be performed using an AFP machine. One or more steps of AFP process may be automated.

In some embodiments, the method further includes curing the CMC component after performing the plurality of manufacturing steps. Specifically, the method may include curing a preform formed from partially cured prepreg material.

In some embodiments, the CMC component is cured in an autoclave. The autoclave may apply a combination of vacuum, external pressure, and heat to cure the CMC component.

In some embodiments, each of the plurality of parts is made of prepreg plies.

In some embodiments, each of the prepreg plies is unidirectional.

In some embodiments, each of the prepreg plies is woven. The method may be suitable for both unidirectional prepreg plies and woven prepreg plies.

In some embodiments, each of the plurality of parts is a wedge. The wedge may at least partially form a root portion of a fan blade of a gas turbine engine.

In some embodiments, at least one ply is layered from a prepreg tape. For example, an AFP machine may layer the at least one ply from the prepreg tape.

According to a second aspect there is provided a CMC component manufactured by the method of the first aspect.

In some embodiments, the CMC component is a fan blade of a gas turbine engine.

According to a third aspect there is provided a gas turbine engine including the CMC component of the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear.

The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e., the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
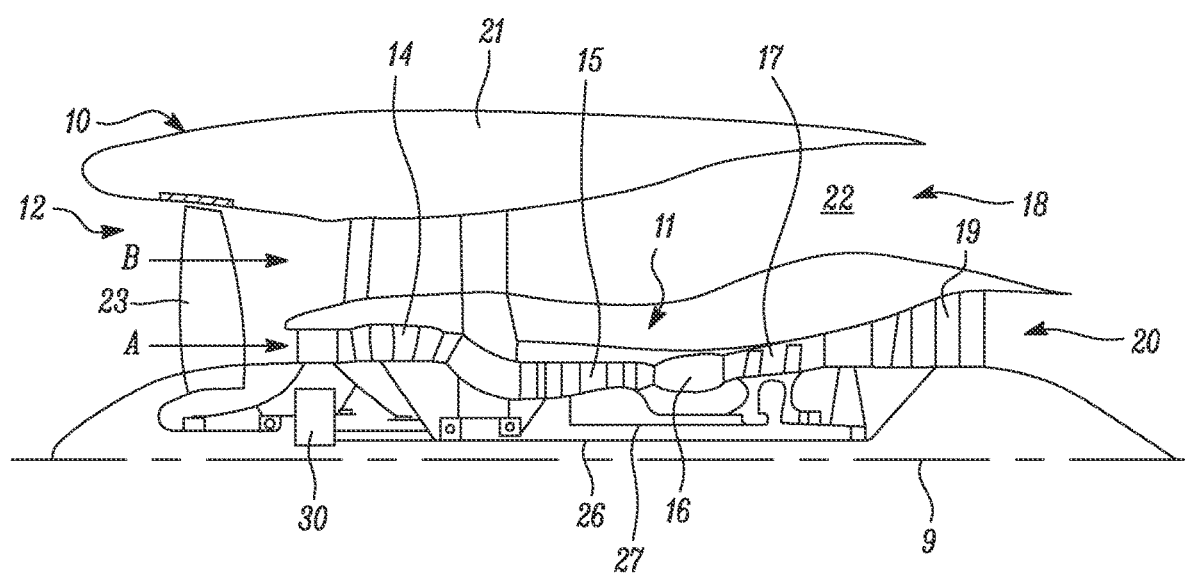
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2A:
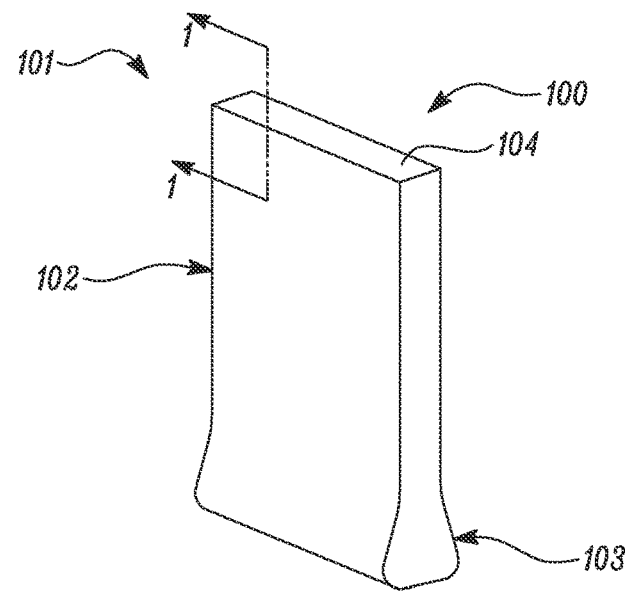
FIG. 2A is a schematic perspective view of a ceramic matrix composite (CMC) component in accordance with an embodiment of the present disclosure.
Figure 2B:
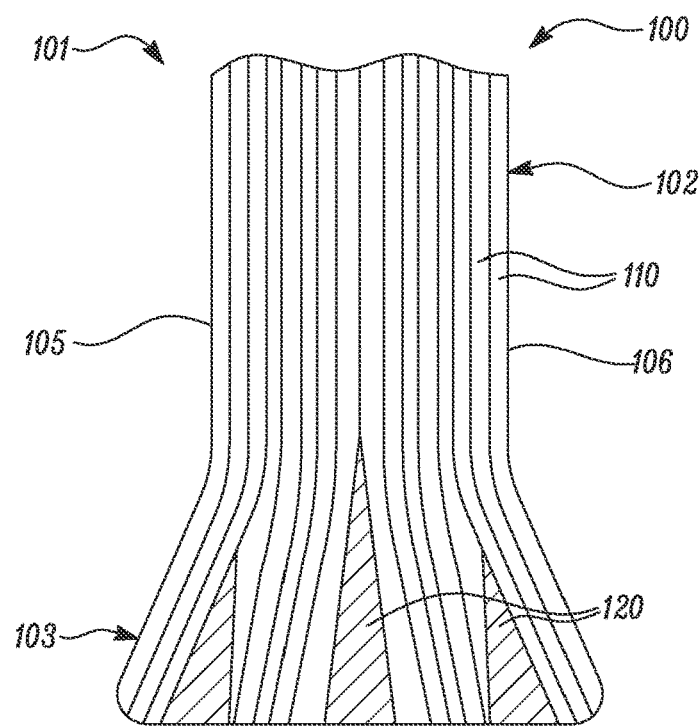
FIG. 2B is a schematic cross-sectional view of a portion of the CMC component taken along a line 1-1 of FIG. 2A in accordance with an embodiment of the present disclosure.

FIG. 2A shows a schematic perspective view of a ceramic matrix composite (CMC) component 100 in accordance with an embodiment of the present disclosure. FIG. 2B shows a schematic cross-sectional view of a portion of the CMC component 100 taken along a line 1-1 of FIG. 2A.

As used herein, the term "ceramic matrix composite" or "CMC" refers to a composite made from continuous fibers bound in a ceramic matrix. The fibers can be in tape or cloth form and may include, but are not limited to, fibers formed from silicon carbide, alumina, aluminosilicate, aluminoborosilicate, carbon, silicon nitride, silicon boride, silicon boronitride, and similar materials. The ceramic matrix may include, but is not limited to, matrices formed from aluminosilicate, alumina, silicon carbide, silicon nitride, carbon, and similar materials. The term "CMC component" refers to a component made from CMC.

As used herein, the term "prepreg" or "prepreg material" refers to a moulding intermediate substrate where a matrix (e.g., a layer) of reinforcing fibre is impregnated with a matrix resin.

The term "ply" or "prepreg ply" refers to a layer of prepreg material including a resin that is uncured or partially cured (B-staged) but that is not fully cured.

As used herein, a CMC component before undergoing a curing process can be understood as a preform. Preforms may include multiple layers (or plies) of partially cured prepreg material. Such preforms may be cured, for example, in an autoclave, to form a CMC component. In the present disclosure, the terms "CMC component" and "preform" may be used interchangeably when referring to an uncured CMC component.

As used herein, the term "prepreg tape" refers to a tape including a prepreg material wound around a bobbin or a spool. An automated fibre placement (AFP) machine may lay the prepreg material from such prepreg tapes to form a preform of the CMC component.

Referring to FIGS. 2A and 2B, the CMC component 100 may include a plurality of plies 110. The CMC component 100 may further include a plurality of parts 120 disposed between the plurality of plies 110. The plurality of plies 110 and the plurality of parts 120 may together form the CMC component 100.

It may be noted that the CMC component 100 shown in FIGS. 2A and 2B is cured. To manufacture the CMC component 100, a preform of the CMC component 100 may be formed and subsequently cured.

The CMC component 100 may be manufactured using an automated fibre placement (AFP) process. The AFP process may include layering at least one ply 110 from the plurality of plies 110 on a mandrel (not shown) and disposing at least one part 120 from the plurality of parts 120 on the at least one ply 110. As used herein, the term "mandrel" broadly refers to any suitable support (e.g., a tool) on which plies may be layered. The plies may be collated on the mandrel to define the shape, or near shape, of the desired component to be manufactured. A mandrel may have, for example, a flat, a convex, or a concave surface.

A subsequently layered ply 110 may be layered partially on the at least one part 120 and partially on the at least one ply 110. This process may be repeated to form a preform of the CMC component 100. The preform of the CMC component 100 may then be cured, for example, in an autoclave, to form the CMC component 100.

The plurality of plies 110 may be layered using an AFP machine. The at least one ply 110 may be layered from a prepreg tape. The plurality of parts 120 may be manually or automatically disposed during manufacturing of the CMC component 100.

The plurality of parts 120 may be manufactured to facilitate manufacturing of the CMC component 100. The plurality of parts 120 may be made from any suitable material, such as a CMC material, metals (e.g., titanium, stainless steel, and the like), etc. In some embodiments, each of the plurality of parts 120 may be made of prepreg plies. In some embodiments, each of the prepreg plies may be unidirectional. In some other embodiments, each of the prepreg plies may be woven. In some embodiments, some parts 120 may include unidirectional prepreg plies and some other parts 120 may include woven prepreg plies.

Each of the plurality of plies 110 and each of the plurality of parts 120 may include any suitable shape and dimensions based on a desired geometry of the CMC component 100. For example, the plurality of parts 120 may include a triangle shape, a polygonal shape, a wedge shape, etc. In some embodiments, each of the plurality of parts 120 may be a wedge.

In the illustrated embodiment of FIGS. 2A and 2B, the CMC component 100 is a fan blade 101 of a gas turbine engine (e.g., the gas turbine engine 10 of FIG. 1). Specifically, the gas turbine engine 10 (shown in FIG. 1) may include the CMC component 100. More specifically, the fan 23 (shown in FIG. 1) of the gas turbine engine 10 may include the fan blade 101.

The fan blade 101 may include an aerofoil portion 102. The aerofoil portion 102 may extend from a root portion 103 to a tip 104. The aerofoil portion 102 may include a pressure side 105 and a suction side 106.

The plurality of plies 110 may extend in a spanwise direction. The aerofoil portion 102 may be substantially formed by the plurality of plies 110. The root portion 103 may be substantially formed by the plurality of parts 120 and partially formed by the plurality of plies 110.

Figure 3:
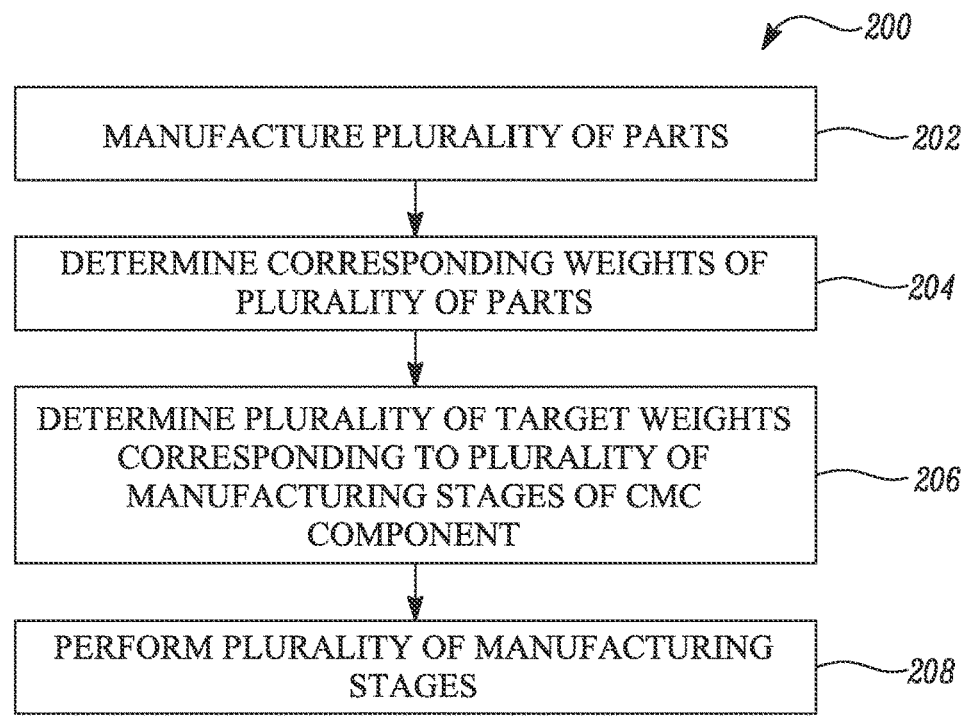
FIG. 3 is a flowchart depicting various steps of a method of manufacturing a CMC component in accordance with an embodiment of the present disclosure.

FIG. 3 shows a flowchart depicting various steps of a method 200 of manufacturing a CMC component (e.g., the CMC component 100 of FIGS. 2A and 2B) in accordance with an embodiment of the present disclosure. Some steps of the method 200 may be performed by an AFP machine. Further, some steps of the method 200 may be performed manually or automatically. In some embodiments, the CMC component 100 (shown in FIGS. 2A and 2B) may be manufactured by the method 200.

Figure 4:
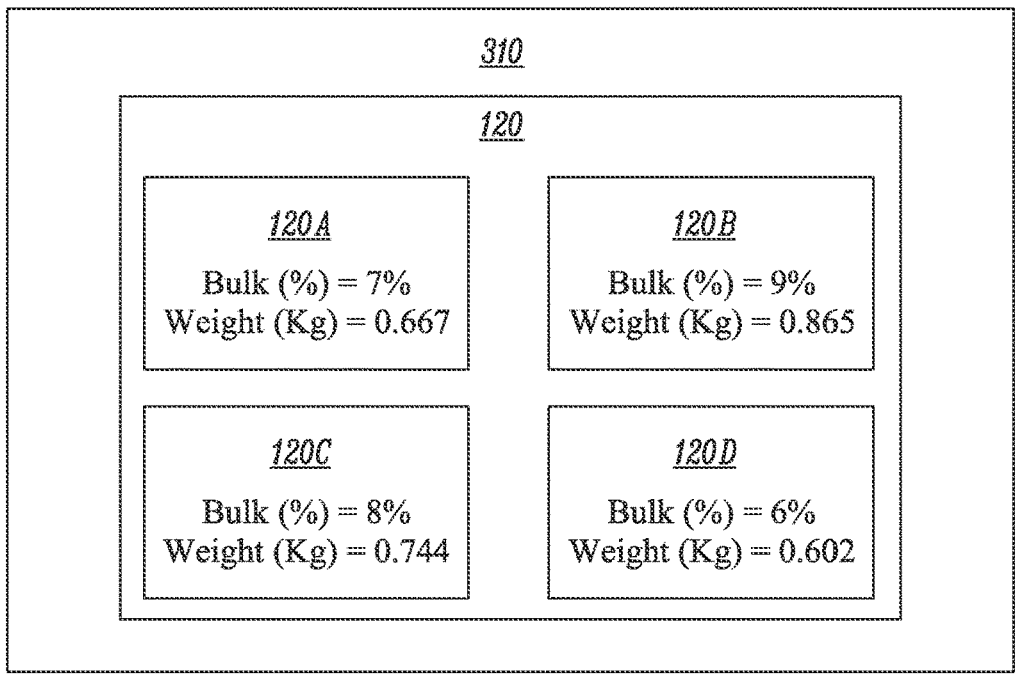
FIG. 4 is a schematic block diagram of a storage area storing a plurality of parts accordance with an embodiment of the present disclosure.

FIG. 4 shows a schematic block diagram of a storage area 310 storing the plurality of parts 120. The method 200 will be described with further reference to FIGS. 2A, 2B, and 4.

At step 202, the method 200 includes manufacturing a plurality of parts. The plurality of parts may be manufactured using any suitable method and technique. In some cases, the plurality of parts may be manufactured by AFP process. In some cases, the plurality of parts may be manufactured by casting, additive manufacturing, and the like. For example, the method 200 may include manufacturing the plurality of parts 120.

As shown in FIG. 4, the plurality of parts 120 may be stored in the storage area 310. The plurality of parts 120 may include a first part 120A, a second part 120B, a third part 120C, and a fourth part 120D.

In some embodiments, each of the plurality of parts may be made of prepreg plies. For example, each of the plurality of parts 120 may be made of prepreg plies. In some embodiments, each of the prepreg plies may be unidirectional. In some other embodiments, each of the prepreg plies may be woven. In some other embodiments, each of the plurality of parts 120 may be made of a metal (e.g., titanium, stainless steel, etc.).

In some embodiments, each of the plurality of parts is a wedge. For example, as shown in FIG. 2B, each of the plurality of parts 120 may be the wedge.

At step 204, the method 200 further includes determining corresponding weights of the plurality of parts. The plurality of parts may be weighed using an automatic weighing system, or manually weighed using a weighing scale. For example, the method 200 may include determining corresponding weights of the plurality of parts 120. In other words, the weight of each of the plurality of parts 120 may be determined.

The method 200 may further include determining a bulk of each of the plurality of parts 120. The bulk of the part 120 may correspond to the weight of the part 120.

As shown in FIG. 4, the weight and the bulk of each of the first, second, third, and fourth parts 120A, 120B, 120C, 120D may be determined. For example, the first part 120B has a weight of 0.667 kilograms (kg) and a bulk of 7%.

At step 206, the method 200 further includes determining a plurality of target weights corresponding to a plurality of manufacturing stages of the CMC component. For example, the method 200 may include determining a plurality of target weights corresponding to a plurality of manufacturing stages of the CMC component 100.

Manufacturing stages of the CMC component 100 may refer to phases of the CMC component 100 during its manufacturing process (e.g., via AFP process). Target weights may be determined based on previously manufactured like CMC components under acceptable tolerance limits. For example, target weights of the CMC component 100 may be determined at 20%, 40%, 60%, 80%, and 100% of its manufacturing process.

At step 208, the method 200 further includes performing the plurality of manufacturing stages.

Figure 5:
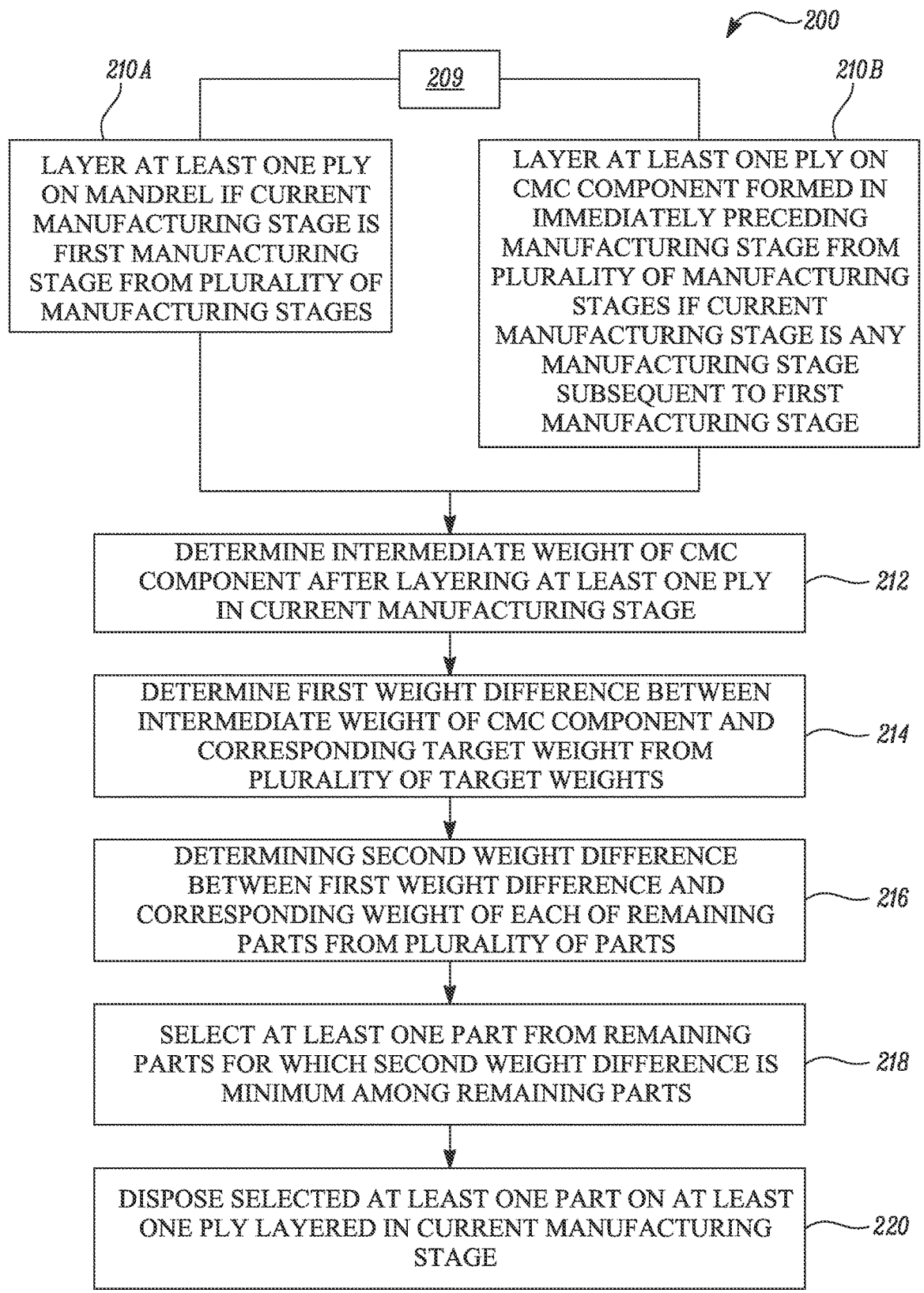
FIG. 5 is a flowchart depicting various steps of each manufacturing stage of the method of FIG. 3 in accordance with an embodiment of the present disclosure.

FIG. 5 shows a flowchart depicting various steps performed during each manufacturing stage from the plurality of manufacturing stages of the method 200 in accordance with an embodiment of the present disclosure. The manufacturing stage is denoted by the reference character 209 in FIG. 5.

Referring to FIGS. 2A, 2B, 4, and 5, if a current manufacturing stage is a first manufacturing stage from the plurality of manufacturing stages, the manufacturing stage 209 includes step 210A. At step 210A, the manufacturing stage 209 includes layering at least one ply on a mandrel. For example, the manufacturing stage 209 may include layering the at least one ply 110 from the plurality of plies 110 on a mandrel.

If the current manufacturing stage is any manufacturing stage subsequent to the first manufacturing stage, the manufacturing stage 209 includes step 210B instead of step 210A. At step 210B, the manufacturing stage 209 includes layering at least one ply on the CMC component formed in an immediately preceding manufacturing stage from the plurality of manufacturing stages. For example, the manufacturing stage 209 may include layering at least one ply 110 on the CMC component 100 formed in an immediately preceding manufacturing stage from the plurality of manufacturing stages.

In some embodiment, the at least one ply is layered in each manufacturing stage by automated fibre placement (AFP). For example, the at least one ply 110 may be layered in each manufacturing stage 209 by automated fibre placement (AFP).

In some embodiments, at least one ply is layered from a prepreg tape. For example, the at least one ply 110 may be layered from a prepreg tape. An AFP machine may use the prepreg tape to lay the at least one ply 110.

At step 212, the manufacturing stage 209 further includes determining an intermediate weight of the CMC component after layering the at least one ply in the current manufacturing stage. For example, the mandrel may be weighed after layering the at least one ply in the current manufacturing stage, and a bare weight of the mandrel may be known. The intermediate weight be determined by subtracting the bare weight of the mandrel from the weight of the mandrel after layering the at least one ply in the current manufacturing stage. In some cases, the intermediate weight may be determined using an automatic weighing system.

For example, the manufacturing stage 209 may include determining the intermediate weight of the CMC component 100 after layering the at least one ply 110 in the current manufacturing stage. The intermediate weight of the CMC component 100 after layering the at least one ply 110 in the current manufacturing stage may be referred to as "IW."

At step 214, the manufacturing stage 209 further includes determining a first weight difference between the intermediate weight of the CMC component and a corresponding target weight from the plurality of target weights. The corresponding target weight corresponds to the current manufacturing stage. The target weight corresponding to the current manufacturing stage may be referred to as "TW." Therefore, the first weight difference may be mathematically expressed as (TW-IW).

At step 216, the manufacturing stage 209 further includes determining a second weight difference between the first weight difference and the corresponding weight of each of the remaining parts from the plurality of parts. For example, the manufacturing stage 209 may include determining the second weight difference between the first weight difference and the corresponding weight of each of the remaining parts 120A-120D from the plurality of parts 120. The second weight difference may be calculated for each of the remaining parts 120A-120D from the plurality of parts 120.

At step 218, the manufacturing stage 209 further includes selecting at least one part from the remaining parts for which the second weight difference is minimum among the remaining parts. For example, the manufacturing stage 209 further may include selecting at least one part 120 from the remaining parts 120A-120D for which the second weight difference is minimum among the remaining parts 120A-120D. For example, at least one part 120 from the first, second, third, and fourth parts 120A, 120B, 120C, 120D for which the second weight difference is minimum may be selected. Assuming that the second weight difference is minimum for the second part 120B, the second part 120B may be selected at step 218.

At step 220, the manufacturing stage 209 further includes disposing the selected at least one part on the at least one ply layered in the current manufacturing stage. For example, the manufacturing stage 209 may include disposing the selected at least one part 120 on the at least one ply 110 layered in the current manufacturing stage. For example, as assumed above, the second part 120B may be disposed on the at least one ply 110 layered in the current manufacturing stage.

It may be noted that for the subsequent manufacturing step, the plurality of parts 120 will exclude the second part 120B. That is, for the subsequent manufacturing step, the plurality of parts 120 will include first, third, and fourth parts 120A, 120C, 120D.

Referring to FIGS. 3 and 5, in some embodiments, the method 200 further includes curing the CMC component after performing the plurality of manufacturing steps. For example, the method 200 may include curing the CMC component 100 after performing the plurality of manufacturing steps.

In some embodiments, the CMC component may be cured in an autoclave. For example, the CMC component 100 may be cured in an autoclave.

The method 200 may minimize a variation of bulk and weight between multiple units the CMC component 100 before curing. By using the method 200, the multiple units of the CMC component 100 may have substantially similar weight and bulk before curing. As a result, after curing, the multiple units of the CMC component 100 may have similar physical characteristics. The method 200 may reduce variation between the multiple units of the CMC component 100.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of manufacturing a ceramic matrix composite (CMC) component, the method comprising:
   manufacturing a plurality of parts;
   determining corresponding weights of the plurality of parts;
   determining a plurality of target weights corresponding to a plurality of manufacturing stages of the CMC component; and
   performing the plurality of manufacturing stages, wherein each manufacturing stage comprises:
      layering at least one ply on a mandrel if a current manufacturing stage is a first manufacturing stage from the plurality of manufacturing stages;
      layering at least one ply on the CMC component formed in an immediately preceding manufacturing stage from the plurality of manufacturing stages if the current manufacturing stage is any manufacturing stage subsequent to the first manufacturing stage;
      determining an intermediate weight of the CMC component after layering the at least one ply in the current manufacturing stage;
      determining a first weight difference between the intermediate weight of the CMC component and a corresponding target weight from the plurality of target weights, the corresponding target weight corresponding to the current manufacturing stage;
      determining a second weight difference between the first weight difference and the corresponding weight of each of the remaining parts from the plurality of parts;
      selecting at least one part from the remaining parts for which the second weight difference is minimum among the remaining parts; and
   disposing the selected at least one part on the at least one ply layered in the current manufacturing stage.

2. The method of claim 1, wherein the at least one ply is layered in each manufacturing stage by automated fibre placement.

3. The method of claim 1, further comprising curing the CMC component after performing the plurality of manufacturing stages.

4. The method of claim 3, wherein the CMC component is cured in an autoclave.

5. The method of claim 1, wherein each of the plurality of parts is made of prepreg plies.

6. The method of claim 5, wherein each of the prepreg plies is unidirectional.

7. The method of claim 5, wherein each of the prepreg plies is woven.

8. The method of claim 1, wherein each of the plurality of parts is a wedge.

9. The method of claim 1, wherein the at least one ply is layered from a prepreg tape.

10. The CMC component manufactured by the method of claim 1.

11. The CMC component of claim 10, wherein the CMC component is a fan blade of a gas turbine engine.

12. The gas turbine engine comprising the CMC component of claim 10.

* * * * *